United States Patent
Ou et al.

(10) Patent No.: US 11,175,702 B2
(45) Date of Patent: Nov. 16, 2021

(54) SCROLL MOUSE

(71) Applicant: Primax Electronics Ltd., Taipei (TW)

(72) Inventors: Hsiang-Yu Ou, Taipei (TW); Chun-Lin Chu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 110 days.

(21) Appl. No.: 16/730,595

(22) Filed: Dec. 30, 2019

(65) Prior Publication Data

US 2021/0149450 A1    May 20, 2021

(30) Foreign Application Priority Data

Nov. 15, 2019 (TW) .................................. 108141629

(51) Int. Cl.
| | |
|---|---|
| *G06F 3/00* | (2006.01) |
| *G06F 1/16* | (2006.01) |
| *G06F 3/0354* | (2013.01) |
| *G06F 3/0362* | (2013.01) |

(52) U.S. Cl.
CPC .......... *G06F 1/1656* (2013.01); *G06F 3/0362* (2013.01); *G06F 3/03543* (2013.01)

(58) Field of Classification Search
None
See application file for complete search history.

(56) References Cited

U.S. PATENT DOCUMENTS

| | | | | |
|---|---|---|---|---|
| 5,952,997 | A * | 9/1999 | Hu | G06F 3/0312 345/163 |
| 6,014,130 | A * | 1/2000 | Yung-Chou | G06F 3/03543 250/221 |
| 6,097,371 | A * | 8/2000 | Siddiqui | G06F 3/0312 345/156 |
| 6,353,429 | B1 * | 3/2002 | Long | G01D 5/34738 345/158 |
| 7,042,441 | B2 * | 5/2006 | Adams | G06F 3/0213 345/157 |
| 7,283,121 | B2 * | 10/2007 | Adan | G06F 3/0312 345/156 |
| 7,443,382 | B2 * | 10/2008 | Koo | G06F 3/0362 345/163 |
| 7,616,188 | B1 * | 11/2009 | Blandin | G06F 3/03543 345/163 |
| 8,081,161 | B2 * | 12/2011 | Wu | G06F 3/0362 345/163 |
| 9,069,527 | B2 * | 6/2015 | Leong | G06F 1/1632 |
| 10,409,397 | B2 * | 9/2019 | Tsai | G06F 3/0362 |
| 10,599,238 | B1 * | 3/2020 | Wu | G06F 3/0362 |

(Continued)

*Primary Examiner* — Anthony Q Edwards
*Assistant Examiner* — Rashen E Morrison
(74) *Attorney, Agent, or Firm* — Kirton McConkie; Evan R. Witt

(57) ABSTRACT

A scroll mouse includes a casing, a scroll wheel mouse and a waterproof module. The casing includes a first opening and a second opening. The scroll wheel includes a first rotation shaft and a second rotation shaft. The waterproof module includes a waterproof cap and a waterproof ring. A first gap between the first rotation shaft and the first opening is sealed by the waterproof cap. A second gap between the second rotation shaft and the second opening is sealed by the waterproof ring. Since the foreign liquid is prevented from entering an inner portion of the casing, the scroll mouse has the waterproof function.

11 Claims, 5 Drawing Sheets

(56) References Cited

U.S. PATENT DOCUMENTS

| | | | | |
|---|---|---|---|---|
| 10,725,568 B1* | 7/2020 | Lin | ........................ | G06F 3/0312 |
| 10,838,524 B2* | 11/2020 | Unnikrishnan | ..... | G06F 3/03543 |
| 11,022,121 B2* | 6/2021 | Nishikawa | ............ | F04C 29/028 |
| 2003/0025673 A1* | 2/2003 | Ledbetter | .............. | G06F 3/0312 |
| | | | | 345/163 |
| 2010/0265180 A1* | 10/2010 | Lu | ........................ | G06F 3/0317 |
| | | | | 345/166 |
| 2011/0042192 A1* | 2/2011 | Hou | .................... | H01H 13/063 |
| | | | | 200/302.2 |
| 2011/0211820 A1* | 9/2011 | Yim | ........................ | G03B 17/08 |
| | | | | 396/27 |
| 2014/0015752 A1* | 1/2014 | Lin | .................... | G06F 3/03543 |
| | | | | 345/166 |
| 2014/0333536 A1* | 11/2014 | Tee | ........................ | G06F 3/0312 |
| | | | | 345/163 |
| 2016/0298626 A1* | 10/2016 | Nishide | ............... | F04C 18/0253 |
| 2018/0329525 A1* | 11/2018 | Chang | ................ | G06F 3/03543 |
| 2018/0364817 A1* | 12/2018 | Ota | ........................ | B60K 37/06 |
| 2019/0094994 A1* | 3/2019 | Tsai | ..................... | G06F 3/0362 |
| 2021/0079916 A1* | 3/2021 | Nishikawa | ............ | F04C 29/028 |

* cited by examiner

SCROLL MOUSE

FIELD OF THE INVENTION

The present invention relates to an input device, and more particularly to a scroll mouse.

BACKGROUND OF THE INVENTION

A scroll wheel is one of the widely-used computer peripheral input devices. When a scroll wheel is held by the palm of a user, the user may move the scroll wheel to control the movement of a cursor of the computer system. The scroll wheel complies with the intuitive operating habits of many users. Consequently, the scroll wheel is the most prevailing input device.

The structure and the function of a conventional scroll wheel will be described as follows. FIG. 1 schematically illustrates the connection between a conventional scroll mouse and a computer system. The computer system 100 comprises a computer host 101 and a display screen 102. The computer host 101 is in communication with a scroll mouse 1 and the display screen 102. The computer host 101 has a connecting port 1011. A graphic-based window 1021 and a cursor 1022 are shown on the display screen 102. The scroll mouse 1 is used for controlling the movement or operation of the cursor 1022. Consequently, the computer host 101 executes a corresponding command. The scroll mouse 1 comprises a casing 10, a left button 11, a right button 12, a scroll mouse 13, and a connecting cable 14. The left button 11 is disposed on the casing 10 and arranged beside a left side of the scroll mouse 13. In addition, the left button 11 is exposed outside the casing 10. When the left button 11 is pressed down, a left button signal is generated. Like the left button 11, the right button 12 is disposed on the casing 10 and arranged beside a right side of the scroll mouse 13. The right button 12 is also exposed outside the casing 10. When the right button 12 is pressed down, a right button signal is generated. The scroll mouse 13 is disposed within the casing 10 and partially exposed outside the casing 10. When the scroll mouse 13 is rotated by the user, a corresponding scrolling data is generated. After the scrolling data is transmitted to the computer host 101, the computer host 101 performs an operation of scrolling the graphic-based window 1021 upwardly or downwardly according to the scrolling data. The connecting cable 14 is disposed within the casing 10 and protruded outside the casing 10. When the connecting cable 14 is connected with the connecting port 1011, the communication between the scroll mouse 1 and the computer system 100 is established.

Generally, during the process of operating the conventional scroll mouse 1, the conventional scroll mouse 1 is placed on a working surface (e.g. a desk surface). The user may sometimes place beverages or tea on the desk surface and beside the scroll mouse 1. That is, the user may drink the beverages or tea while operating the scroll mouse 1. However, if the beverages or tea is inadvertently spilled by the user, the beverages or tea may be splashed into the internal portion of the conventional scroll mouse 1 through the seam between the casing 10 and the scroll mouse 13. Once the beverages or tea flows to the internal circuit board of the scroll mouse 1, the circuit board is possibly suffered from a short-circuited problem. Under this circumstance, the scroll mouse 1 has a malfunction, or even the scroll mouse 1 is unable to be normally operated.

Therefore, there is a need of providing a scroll mouse with a waterproof function.

SUMMARY OF THE INVENTION

The present invention provides a scroll mouse with a waterproof function.

In accordance with an aspect of the present invention, a scroll mouse is provided. The scroll mouse includes a casing, a scroll wheel mouse and a waterproof module. The casing includes an accommodation structure, a first opening and a second opening. The first opening is formed in a first protrusion structure of the casing and in communication with the accommodation structure. The second opening is formed in a second protrusion structure of the casing and in communication with the accommodation structure. The scroll wheel module is partially received within the accommodation structure and penetrated through the first opening and the second opening. The scroll wheel includes a wheel body, a first rotation shaft and a second rotation shaft. The wheel body is received within the accommodation structure and partially exposed outside the accommodation structure. When the wheel body is rotated by a user, the wheel body is rotated relative to the casing. The first rotation shaft is penetrated through the first opening and the wheel body. The first rotation shaft is rotatable relative to the casing and synchronously rotatable with the wheel body. The second rotation shaft is penetrated through the second opening and coupled with the first rotation shaft. The second rotation shaft is rotatable relative to the casing and synchronously rotatable with the first rotation shaft. The waterproof module is disposed on the casing. A first gap between the first rotation shaft and the first opening and a second gap between the second rotation shaft and the second opening are sealed by the waterproof module. Consequently, foreign liquid is prevented from entering an inner portion of the casing.

In accordance with another aspect of the present invention, a scroll mouse is provided. The scroll mouse includes a casing, a scroll wheel mouse and a waterproof module. The casing includes an accommodation structure, a first opening and a second opening. The first opening is formed in a first protrusion structure of the casing and in communication with the accommodation structure. The second opening is formed in a second protrusion structure of the casing and in communication with the accommodation structure. The scroll wheel module is partially received within the accommodation structure and penetrated through the first opening and the second opening. The scroll wheel includes a wheel body, a first rotation shaft and a second rotation shaft. The wheel body is received within the accommodation structure and partially exposed outside the accommodation structure. When the wheel body is rotated by a user, the wheel body is rotated relative to the casing. The first rotation shaft is penetrated through the first opening and the wheel body. The first rotation shaft is rotatable relative to the casing and synchronously rotatable with the wheel body. The second rotation shaft is penetrated through the second opening and coupled with the first rotation shaft. The second rotation shaft is rotatable relative to the casing and synchronously rotatable with the first rotation shaft. The waterproof module is disposed on the casing for preventing foreign liquid from entering an inner portion of the casing. The waterproof module includes a waterproof cap and a waterproof ring. The waterproof cap is inserted into the first opening and contacted with a periphery of the first opening. The foreign liquid is prevented from flowing through the first opening by the waterproof cap. The waterproof ring is sheathed around the second rotation shaft and contacted with a periphery of the second opening. The foreign liquid is prevented from flowing through the second opening by the waterproof ring.

From the above descriptions, the present invention provides the scroll mouse. The scroll mouse is equipped with the waterproof module in the path through which the foreign liquid possibly flows into casing. That is, the first gap between the first rotation shaft and the first opening is sealed by the waterproof cap, and the second gap between the second rotation shaft and the second opening are sealed by the waterproof ring. Since the foreign liquid is prevented from entering an inner portion of the casing, the scroll mouse has the waterproof function. In other words, the scroll mouse of the present invention is capable of overcoming the drawbacks of the conventional technologies.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
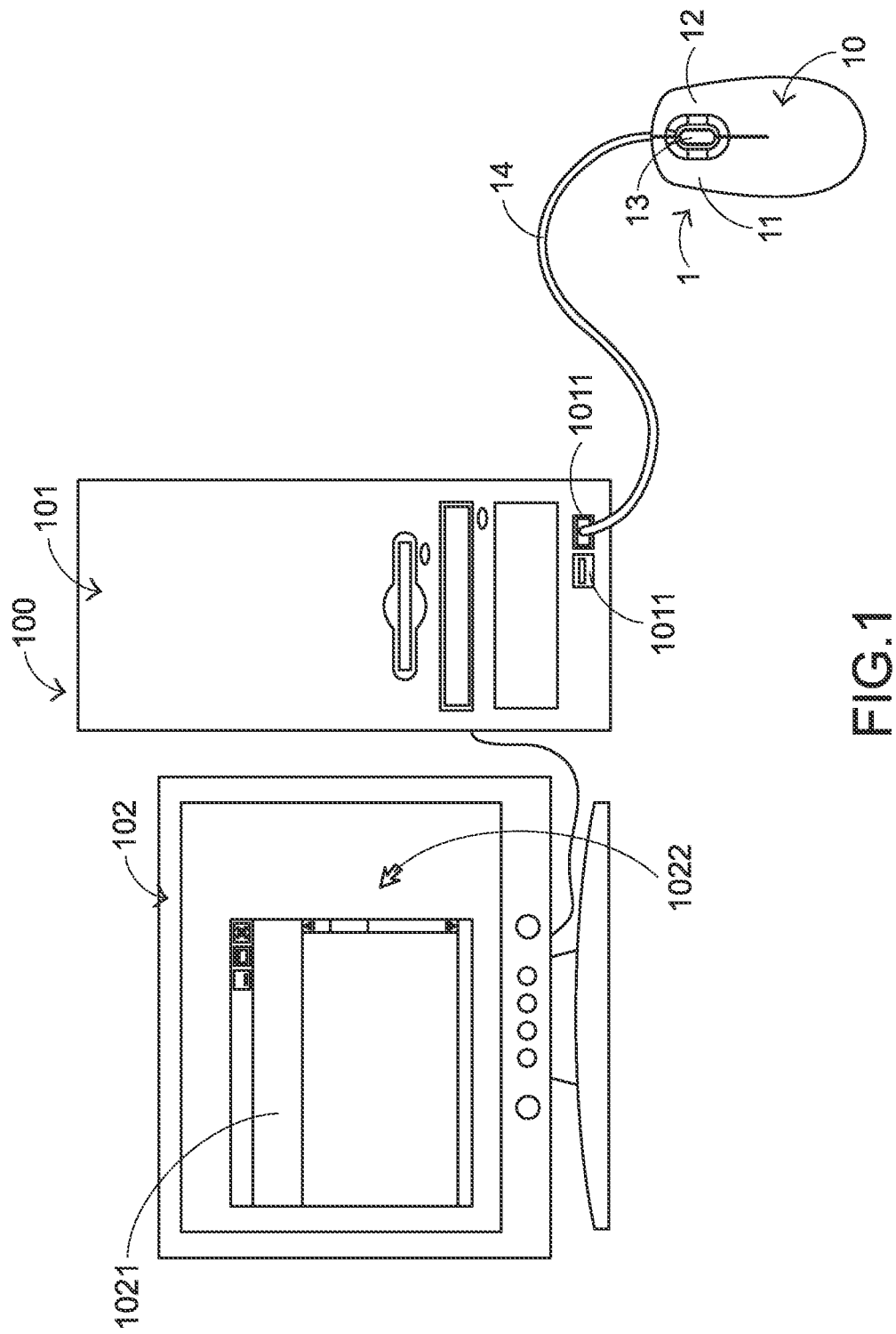
FIG. 1 is a schematic diagram illustrating the connection between a conventional scroll mouse and a computer system.

The present invention provides a scroll mouse in order to overcome the drawbacks of the conventional technologies. The embodiments of present invention will be described more specifically with reference to the following drawings. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 2:
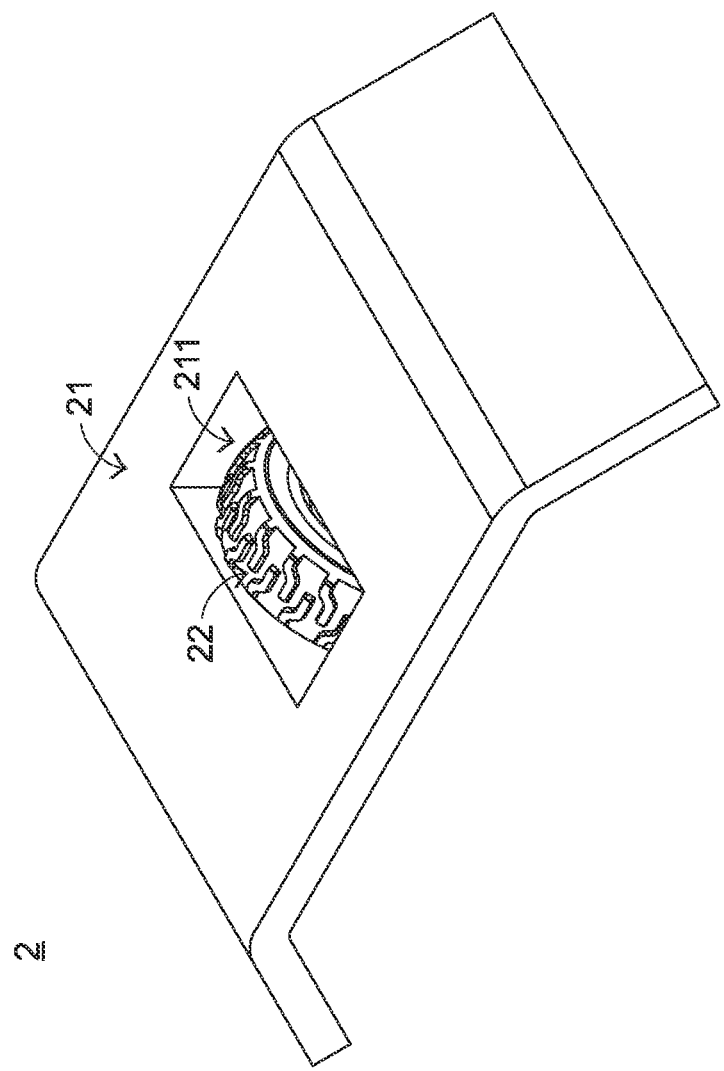
FIG. 2 is a schematic perspective view illustrating a portion of a scroll mouse according to an embodiment of the present invention.
Figure 3:
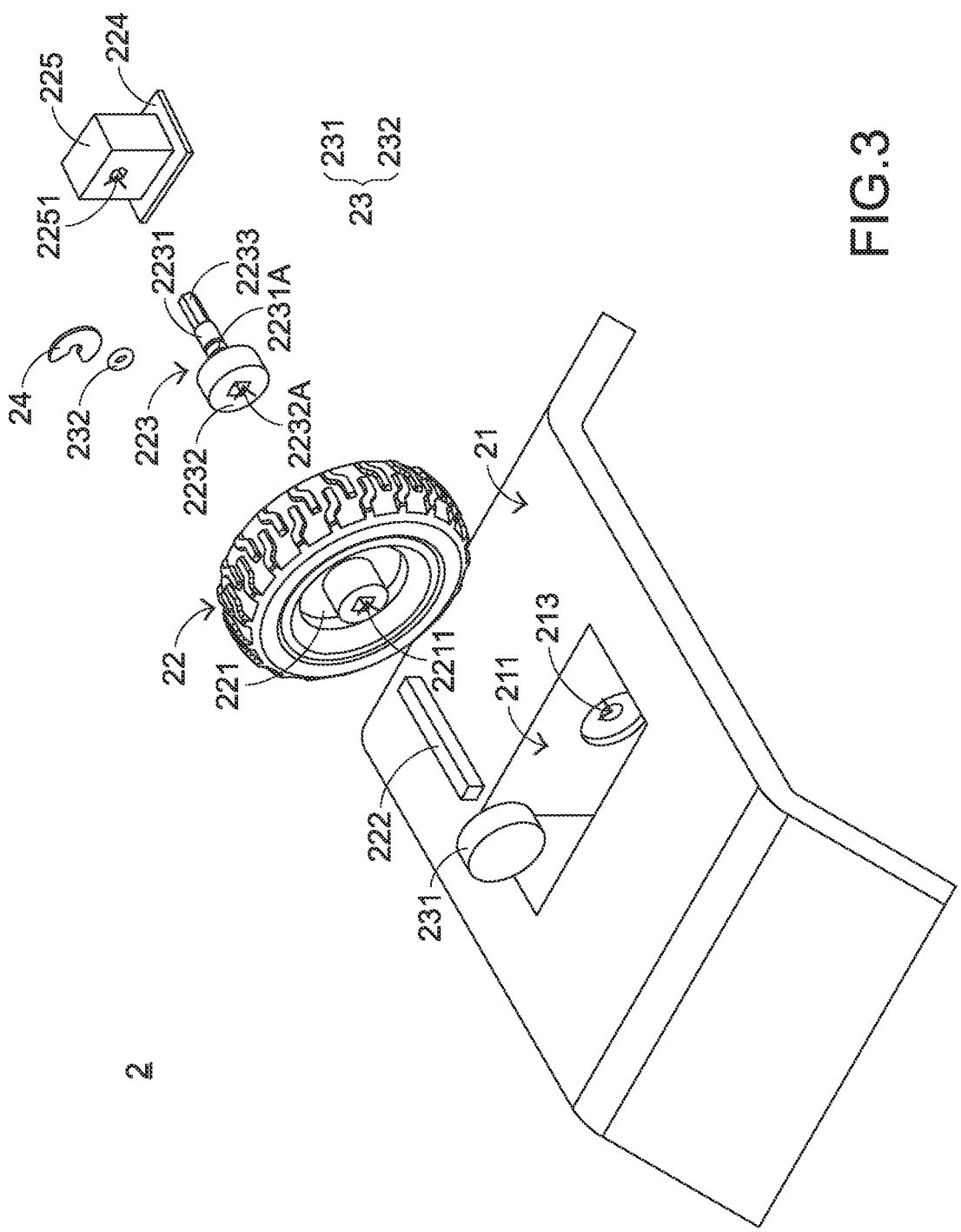
FIG. 3 is a schematic exploded view illustrating a portion of the scroll mouse according to the embodiment of the present invention.
Figure 4:
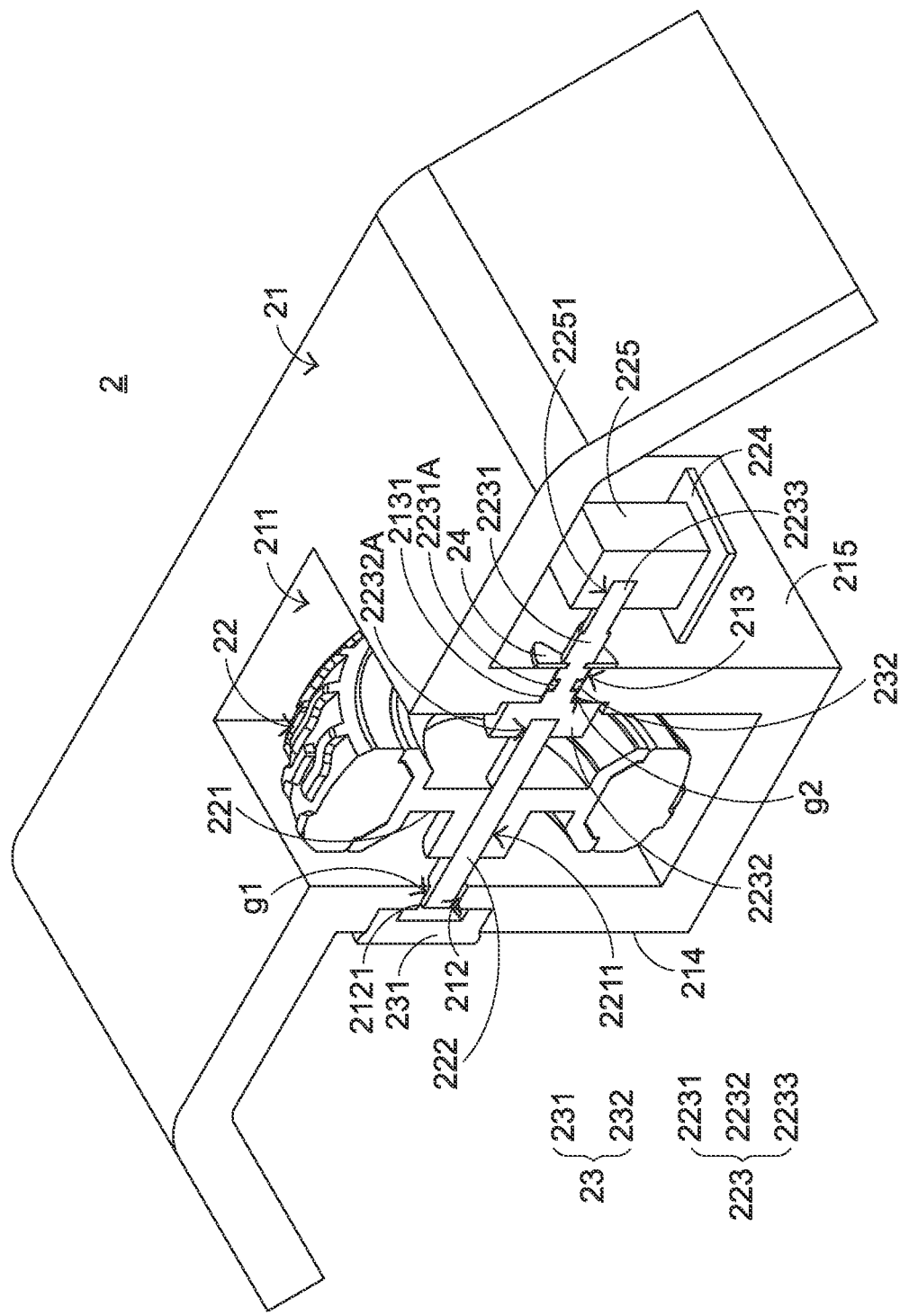
FIG. 4 is a schematic cutaway view illustrating a portion of the scroll mouse according to the embodiment of the present invention.

Hereinafter, the structure of the scroll mouse of the present invention will be illustrated with reference to FIGS. 2, 3 and 4. FIG. 2 is a schematic perspective view illustrating a portion of a scroll mouse according to an embodiment of the present invention. FIG. 3 is a schematic exploded view illustrating a portion of the scroll mouse according to the embodiment of the present invention. FIG. 4 is a schematic cutaway view illustrating a portion of the scroll mouse according to the embodiment of the present invention. In this embodiment, the scroll mouse 2 comprises a casing 21, a scroll wheel module 22, a waterproof module 23 and a locking ring 24. The casing 21 comprises an accommodation structure 211, a first opening 212 and a second opening 231. The first opening 212 is formed in a first protrusion structure 214 of the casing 21. Moreover, the first opening 212 is in communication with the accommodation structure 211. The second opening 231 is formed in a second protrusion structure 215 of the casing 21. Moreover, the second opening 231 is in communication with the accommodation structure 211.

A portion of the scroll wheel module 22 is received within the accommodation structure 211 and penetrated through the first opening 212 and the second opening 231. The scroll wheel module 22 comprises a wheel body 221, a first rotation shaft 222, a second rotation shaft 223, a circuit board 224 and an encoder 225. The wheel body 221 is received within the accommodation structure 211 and partially exposed outside the accommodation structure 211. When the wheel body 221 is rotated by the user, the wheel body 221 is rotated relative to the casing 21. The wheel body 221 comprises a wheel channel 2211. The first rotation shaft 222 is penetrated through the first opening 212 and the wheel body 221 and combined with the wheel body 221. The first rotation shaft 222 is rotatable relative to the casing 21 and synchronously rotatable with the wheel body 221. The second rotation shaft 223 is penetrated through the second opening 213 and coupled with the first rotation shaft 222. The second rotation shaft 223 is rotatable relative to the casing 21 and synchronously rotatable with the first rotation shaft 222. The circuit board 224 is located under the casing 21. The encoder 225 is installed on the circuit board 224 and electrically connected with the circuit board 224. The encoder 225 has an encoder hole 2251. The second rotation shaft 223 is inserted into the encoder hole 2251. When the second rotation shaft 223 is rotated, the encoder 225 is triggered to generate the corresponding scrolling signal.

Figure 5:
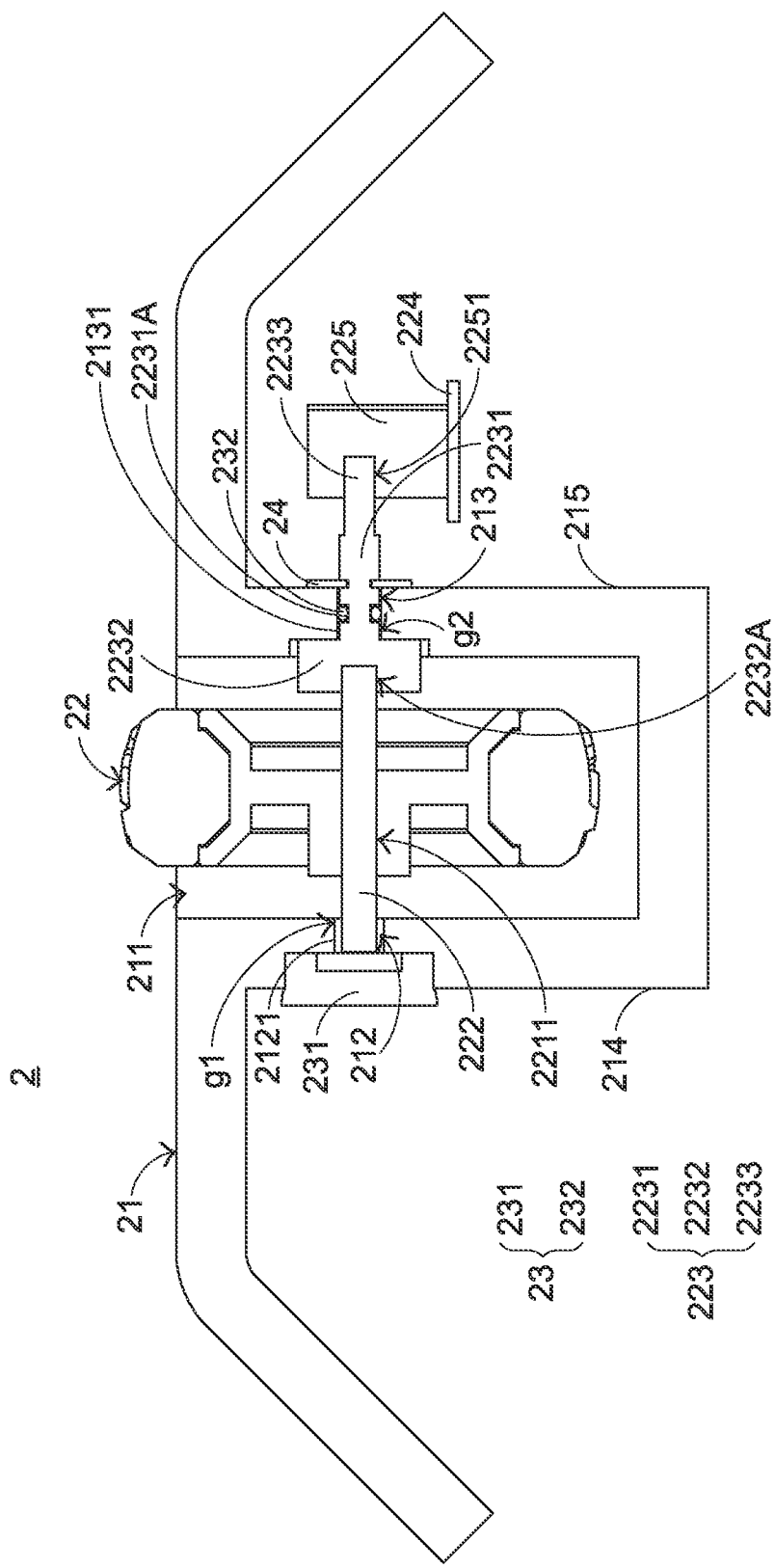
FIG. 5 is a schematic front view illustrating a portion of the scroll mouse according to the embodiment of the present invention.

FIG. 5 is a schematic front view illustrating a portion of the scroll mouse according to the embodiment of the present invention. Please refer to FIGS. 3, 4 and 5. The waterproof module 23 is disposed on the casing 21. A first gap g1 between the first rotation shaft 222 and the first opening 212 and a second gap g2 between the second rotation shaft 223 and the second opening 213 are sealed by the waterproof module 23. Consequently, the foreign liquid is prevented from entering an inner portion of the casing 21. In an embodiment, the waterproof module 23 comprises a waterproof cap 231 and a waterproof ring 232. The waterproof cap 231 is inserted into the first opening 212. The first gap g1 between the first rotation shaft 222 and the first opening 212 is sealed by the waterproof cap 231. Consequently, the foreign liquid is prevented from flowing through the first opening 212. The waterproof ring 232 is sheathed around the second rotation shaft 223. The second gap g2 between the second rotation shaft 223 and the second opening 213 is sealed by the waterproof ring 232. Consequently, the foreign liquid is prevented from flowing through the second opening 213. Especially, the waterproof cap 231 is inserted into the first opening 212 and contacted with a periphery 2121 of the first opening 212, and the waterproof ring 232 is sheathed around the second rotation shaft 223 and contacted with a periphery 2131 of the second opening 213. In this embodiment, both of the waterproof cap 231 and the waterproof ring 232 are made of rubbery material.

The connecting relationships between the scroll wheel module 22, the waterproof module 23 and the casing 21 will be described in more details as follows. Please refer to FIGS. 3, 4 and 5 again. The first rotation shaft 222 is penetrated through the wheel channel 2211, and thus the first rotation shaft 222 is combined with the wheel body 221. The shape of the first rotation shaft 222 and the shape of the wheel channel 2211 are complementary to each other. Consequently, the first rotation shaft 222 can be synchronously rotated with the wheel body 221. For example, the first rotation shaft 222 is a rectangular shaft, and the wheel channel 2211 is a rectangular channel. It is noted that numerous modifications and alterations may be made while retaining the teachings of the invention. For example, in another embodiment, the first rotation shaft is a non-circular shaft. As long as the first rotation shaft can be combined with the wheel body and synchronously rotated with the wheel body, the shape of the wheel channel is not restricted. That is, the wheel body has a non-circular shape or any other appropriate shape complementary to the first rotation shaft.

The second rotation shaft 223 comprises a shaft body 2231, a first coupling part 2232 and a second coupling part 2233. The shaft body 2231 is penetrated through the second opening 213 and fixed in the casing 21. The shaft body 2231 comprises a ring-shaped groove 2231A. The waterproof ring 232 is sheathed around the ring-shaped groove 2231A and contacted with the periphery 2131 of the second opening 213. Consequently, the second gap g2 is sealed by the waterproof ring 232. The first coupling part 2232 is located at a first end of the shaft body 2231 and coupled with the first rotation shaft 222. The first coupling part 2232 comprises a coupling recess 2232A. A first end of the first rotation shaft 222 is accommodated within the coupling recess 2232A. The shape of the coupling recess 2232A and the shape of the first end of the first rotation shaft 222 are complementary to each other. The second coupling part 2233 is located at a second end of the shaft body 2231. The second coupling part 2233 is inserted into the encoder hole 2251 and coupled with the encoder 225. The shape of the second coupling part 2233 and the shape of the encoder hole 2251 are complementary to each other. The locking ring 24 is installed on the shaft body 2231. Through the locking ring 24, the second rotation shaft 223 is fixed in the casing 21 in a locking manner. Since the scroll wheel module 22 is fixed in the casing 21 through the locking ring 24, the scroll wheel module 22 is not detached from the casing 21.

The following two aspects should be specially described. Firstly, the scroll wheel module 22, the waterproof module 23 and the casing are assembled by the following assembling process. Firstly, the encoder 225 is installed on the circuit board 224, the waterproof ring 232 is sheathed around the ring-shaped groove 2231A, and the second coupling part 2233 of the second rotation shaft 223 is inserted into the encoder hole 2251 and coupled with the encoder 225. Then, the locking ring 24 is installed on the shaft body 2231 of the second rotation shaft 223. Then, the first rotation shaft 222 is penetrated through the first opening 212 and the wheel channel 2211 and inserted into the coupling recess 2232A. Consequently, the first rotation shaft 222 and the second rotation shaft 223 are coupled with each other. Afterwards, the waterproof cap 231 is installed. That is, the waterproof cap 231 is inserted into the first opening 212 and contacted with the periphery 2121 of the first opening 212.

Secondly, the waterproof ring 232 is contacted with the periphery 2131 of the second opening 213 in order to increase the waterproof efficacy of the waterproof module 23. However, in case that the friction between the second rotation shaft 223 (or the waterproof ring 232) and the periphery 2131 of the second opening 213 is too large, the second rotation shaft 223 is not rotated smoothly or the second rotation shaft 223 is rotated difficultly. For solving this problem, the external surface of the shaft body 2231 and the periphery 2131 of the second opening 213 may undergo a polishing treatment. Consequently, when the waterproof ring 232 is contacted with the periphery 2131 of the second opening 213, the shaft body 2231 can rotated relative to the casing 21 more smoothly. In another embodiment, a lubricant is applied to the waterproof ring 232. Consequently, the friction between the waterproof ring 232 and the periphery 2131 of the second opening 213 is reduced.

From the above descriptions, the present invention provides the scroll mouse. The scroll mouse is equipped with the waterproof module in the path through which the foreign liquid possibly flows into casing. That is, the first gap between the first rotation shaft and the first opening is sealed by the waterproof cap, and the second gap between the second rotation shaft and the second opening are sealed by the waterproof ring. Since the foreign liquid is prevented from entering an inner portion of the casing, the scroll mouse has the waterproof function. In other words, the scroll mouse of the present invention is capable of overcoming the drawbacks of the conventional technologies.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scroll mouse, comprising:
    a casing comprising an accommodation structure, a first opening and a second opening, wherein the first opening is formed in a first protrusion structure of the casing and in communication with the accommodation structure, and the second opening is formed in a second protrusion structure of the casing and in communication with the accommodation structure;
    a scroll wheel module partially received within the accommodation structure and penetrated through the first opening and the second opening, wherein the scroll wheel comprises:
        a wheel body received within the accommodation structure and partially exposed outside the accommodation structure, wherein when the wheel body is rotated by a user, the wheel body is rotated relative to the casing;
        a first rotation shaft penetrated through the first opening and the wheel body, wherein the first rotation shaft is rotatable relative to the casing and synchronously rotatable with the wheel body; and
        a second rotation shaft penetrated through the second opening and coupled with the first rotation shaft, wherein the second rotation shaft is rotatable relative to the casing and synchronously rotatable with the first rotation shaft; and
    a waterproof module disposed on the casing, wherein a first gap between the first rotation shaft and the first opening and a second gap between the second rotation shaft and the second opening are sealed by the waterproof module, so that foreign liquid is prevented from entering an inner portion of the casing, wherein the waterproof module comprises:
        a waterproof cap inserted into the first opening, wherein the first gap between the first rotation shaft and the first opening is sealed by the waterproof cap, so that the foreign liquid is prevented from flowing through the first opening; and
        a waterproof ring sheathed around the second rotation shaft, wherein the second gap between the second rotation shaft and the second opening is sealed by the waterproof ring, so that the foreign liquid is prevented from flowing through the second opening.

2. The scroll mouse according to claim 1, wherein the second rotation shaft comprises:
   a shaft body penetrated through the second opening and fixed in the casing, and comprising a ring-shaped groove, wherein the waterproof ring is sheathed around the ring-shaped groove and contacted with a periphery of the second opening;
   a first coupling part located at a first end of the shaft body and coupled with the first rotation shaft; and
   a second coupling part located at a second end of the shaft body, and inserted into an encoder hole of an encoder, wherein a shape of the second coupling part and a shape of the encoder hole are complementary to each other.

3. The scroll mouse according to claim 2, wherein the first coupling part comprises a coupling recess, and a first end of the first rotation shaft is accommodated within the coupling recess, wherein a shape of the coupling recess and a shape of the first end of the first rotation shaft are complementary to each other.

4. The scroll mouse according to claim 1, wherein the wheel body has a wheel channel, and the first rotation shaft is penetrated through the wheel channel and combined with the wheel body, wherein a shape of the first rotation shaft and a shape of the wheel channel are complementary to each other, so that the first rotation shaft is synchronously rotatable with the wheel body.

5. The scroll mouse according to claim 1, wherein the scroll wheel module comprises:
   a circuit board located under the casing; and
   an encoder installed on the circuit board and electrically connected with the circuit board, wherein the encoder comprises an encoder hole, and the second rotation shaft is inserted into the encoder hole, wherein when the second rotation shaft is rotated, the encoder is triggered to generate a scrolling signal.

6. A scroll mouse, comprising:
   a casing comprising an accommodation structure, a first opening and a second opening, wherein the first opening is formed in a first protrusion structure of the casing and in communication with the accommodation structure, and the second opening is formed in a second protrusion structure of the casing and in communication with the accommodation structure;
   a scroll wheel module partially received within the accommodation structure and penetrated through the first opening and the second opening, wherein the scroll wheel comprises:
      a wheel body received within the accommodation structure and partially exposed outside the accommodation structure, wherein when the wheel body is rotated by a user, the wheel body is rotated relative to the casing;
      a first rotation shaft penetrated through the first opening and the wheel body, wherein the first rotation shaft is rotatable relative to the casing and synchronously rotatable with the wheel body; and
      a second rotation shaft penetrated through the second opening and coupled with the first rotation shaft, wherein the second rotation shaft is rotatable relative to the casing and synchronously rotatable with the first rotation shaft; and
   a waterproof module disposed on the casing for preventing foreign liquid from entering an inner portion of the casing, wherein the waterproof module comprises:
      a waterproof cap inserted into the first opening and contacted with a periphery of the first opening, wherein the foreign liquid is prevented from flowing through the first opening by the waterproof cap; and
      a waterproof ring sheathed around the second rotation shaft and contacted with a periphery of the second opening, wherein the foreign liquid is prevented from flowing through the second opening by the waterproof ring.

7. The scroll mouse according to claim 6, wherein the second rotation shaft comprises:
   a shaft body penetrated through the second opening and fixed in the casing, and comprising a ring-shaped groove, wherein the waterproof ring is sheathed around the ring-shaped groove and contacted with the periphery of the second opening;
   a first coupling part located at a first end of the shaft body and coupled with the first rotation shaft; and
   a second coupling part located at a second end of the shaft body, and inserted into an encoder hole of an encoder, wherein a shape of the second coupling part and a shape of the encoder hole are complementary to each other.

8. The scroll mouse according to claim 7, wherein the first coupling part comprises a coupling recess, and a first end of the first rotation shaft is accommodated within the coupling recess, wherein a shape of the coupling recess and a shape of the first end of the first rotation shaft are complementary to each other.

9. The scroll mouse according to claim 7, wherein the scroll mouse further comprising a locking ring, and the locking ring is installed on the shaft body, wherein the second rotation shaft is fixed in the casing in a locking manner through the locking ring.

10. The scroll mouse according to claim 6, wherein the wheel body has a wheel channel, and the first rotation shaft is penetrated through the wheel channel and combined with the wheel body, wherein a shape of the first rotation shaft and a shape of the wheel channel are complementary to each other, so that the first rotation shaft is synchronously rotatable with the wheel body.

11. The scroll mouse according to claim 6, wherein the scroll wheel module comprises:
   a circuit board located under the casing; and
   an encoder installed on the circuit board and electrically connected with the circuit board, wherein the encoder comprises an encoder hole, and the second rotation shaft is inserted into the encoder hole, wherein when the second rotation shaft is rotated, the encoder is triggered to generate a scrolling signal.

* * * * *